US006195314B1

(12) United States Patent
Inui et al.

(10) Patent No.: US 6,195,314 B1
(45) Date of Patent: Feb. 27, 2001

(54) OBJECTIVE LENS DRIVING DEVICE AND OPTICAL DISC APPARATUS USING THE SAME

(75) Inventors: Shinro Inui, Hitachinaka; Naohiko Otoshi, Yokohama; Katsuhiko Izumi, Chigasaki; Michio Miura; Naomitsu Kuroda, both of Yokohama; Ryuichiro Mizuno, Chigasaki, all of (JP)

(73) Assignees: Hitachi, Ltd., Tokyo; Hitachi Media Electronics Co., Ltd., Iwate-ken, both of (JP)

(*) Notice: Subject to any disclaimer, the term of this patent is extended or adjusted under 35 U.S.C. 154(b) by 0 days.

(21) Appl. No.: 08/968,753

(22) Filed: Aug. 19, 1997

(30) Foreign Application Priority Data

Aug. 19, 1996 (JP) .................................................. 8-217373
Aug. 21, 1996 (JP) .................................................. 8-219683
Sep. 25, 1996 (JP) .................................................. 8-252697

(51) Int. Cl.[7] ........................................................ G11B 7/00
(52) U.S. Cl. ..................................... 369/44.14; 369/44.22
(58) Field of Search ............................. 369/44.14, 44.15, 369/44.16, 44.17, 44.18, 44.22, 44.23; 359/824, 814

(56) References Cited

U.S. PATENT DOCUMENTS 5,729,510 3/1998 Kasahara et al. .

FOREIGN PATENT DOCUMENTS 0 427 441 A2 5/1991 (EP) .
0 712 122 A2 5/1996 (EP) .
0 727 776 A1 8/1996 (EP) .
62-287439 12/1987 (JP) .
2-35330 3/1990 (JP) .
4-184721 7/1992 (JP) .
7-31814 4/1995 (JP) .
8-138265 5/1996 (JP) .
151438 2/1991 (TW) .

OTHER PUBLICATIONS

"Light Pickup for DVD", Nikkei Mechanical, No. 460, pp. 64–64, 1995.

*Primary Examiner*—Paul W. Huber
(74) *Attorney, Agent, or Firm*—Antonelli, Terry, Stout & Kraus, LLP

(57) ABSTRACT

It is an object to perform a thin and compact design of the objective lens driving device. In order to achieve the above object, optical beam is passed through a space surrounded by a tracking coil and a focusing coil which are adjacent to each other and fixed in a holder. Further, it is another object to position the objective lens with high precision in an objective lens driving device for switching a plurality of objective lenses in accordance with the type of an optical disc. In order to achieve this object, magnetic substances which are radially extended with the sliding shaft at the center are provided in the lens holder, and the magnetic substances are located within a plane perpendicular to the plane constituting the magnetic gap and at the outside of the magnetic gap. Still further, in an objective lens driving device it is another object to prevent the occurrence of positional displacement of the objective lens due to resistance force of current supply means such as FPC. To achieve this object, a first objective lens and a second objective lens are arranged so that the objective lens arrangement angle at which the first and second objective lenses are arranged with respect to the shaft center of the sliding shaft is displaced, by a predetermined amount, from the magnetic circuit arrangement angle at which the magnetic substances and the magnets are arranged with respect to the shaft center of the sliding shaft.

10 Claims, 16 Drawing Sheets

3
7-1
7-2
5
4
12-3
12-4
12-1
12-2
6
2
1
9

OBJECTIVE LENS DRIVING DEVICE AND OPTICAL DISC APPARATUS USING THE SAME

BACKGROUND OF THE INVENTION

1. Field of the Invention

The present invention relates to an objective lens driving device and an optical disc apparatus using the objective lens driving device.

2. Description of Related Art

One type of objective lens driving device for use in an optical disc apparatus is disclosed in Japanese Laid-open Utility Model Application No. Hei-2-35330.

FIG. 9 shows the constitution of the objective lens driving device, FIG. 10 is a cross-sectional view of the objective lens driving device which is taken along a line G—G of FIG. 9, and FIG. 11 is a view of FIG. 9 which is taken along the direction of an arrow H.

An objective lens 7 is provided in a lens holder 3, which is supported and guided by a sliding shaft 6 which is slidably and rotatably disposed substantially in parallel to the optical axis direction of the objective lens 7. A focusing coil 5 is wound around the outer peripheral surface of the lens holder 3, and tracking coils 4 are provided at predetermined intervals in the peripheral direction on the outer peripheral portion of the lens holder 3. A magnetic circuit comprising a magnet 2, an outer yoke 1 and an inner yoke 9 is provided to generate magnetic flux so that the magnetic flux traverses the tracking coils 4 and the focusing coil 5. The tracking coils 4 and the focusing coil 5 are supplied with current from current supply means such as a flexible printed circuit (hereinafter referred to as "FPC").

During a focus control operation, the electromagnetic force acts in the direction of the sliding shaft 6 by causing the current to flow into the focusing coil 5 in the forward or reverse direction to move the objective lens 7 in the optical axis direction in accordance with the plane vibration of the recording surface of the optical disc, whereby the spot of the optical beam 8 can follow the recording surface of the optical disc. Further, during a tracking control operation, the electromagnetic force acts as a rotational couple of forces on the outer periphery of the sliding shaft 6 by causing the current to flow into each of the tracking coils 4 in the forward or reverse direction, whereby the spot of the optical beam 8 can follow the eccentricity of the track of the optical disc.

Next, the construction of a magnetic spring in a conventional objective driving device will be described by exemplifying an objective lens driving device disclosed in the official gazette for KOKOKU No. Hei-7-31814.

FIGS. 12 and 13 show an objective lens driving device having one objective lens which is used in a conventional CD apparatus or CD-ROM apparatus, wherein FIG. 12 is a diagram showing the constitution of the objective lens driving device and FIG. 13 is a cross-sectional view of the objective lens driving device which is taken along a line K—K of FIG. 12.

In FIGS. 12 and 13, reference numeral 21 represents an objective lens for focusing an optical beam, reference numeral 22 represents a lens holder, reference numeral 28-1, 28-2 represents a focusing coil, reference numeral 29-1, 29-2 represents a tracking coil, reference numeral 25 represents a sliding shaft, reference numeral 23 represents an inner yoke, reference numeral 24 represents an outer yoke, reference numeral 26-1, 26-2 represents a focusing magnet, reference numeral 27-1, 27-2 represents a tracking magnet, and reference numeral 30-1, 30-2 represents a magnetic substance for positioning the objective lens.

The focusing magnet 26-1, 26-2 is magnetized to have bipolarity in the height direction, and the tracking magnet 27-1, 27-2 is magnetized to have bipolarity in the peripheral direction. The magnetic density distribution in the peripheral direction in the neighborhood of the magnetic substance 30-1, 30-2 which confronts the focusing magnet 26-1, 26-2 is maximized at the center of the magnet, and thus the magnetic substance 30-1, 30-2 is magnetically balanced and stable at the position confronting to the center of the focusing magnet. Paying attention to the flow of the magnetic flux in the height direction, the magnet substance 30-1, 30-2 is magnetically balanced and stable in the neighborhood of the boundary of the N and S poles of the focusing magnet 26-1, 26-2 so as to form a magnetic loop of the N pole of the focusing magnet 26-1, 26-2→the magnetic substance 30-1,30-2→S pole→N pole. Accordingly, the objective lens 21 can be stably positioned by the magnetic balance in the rotational direction (tracking direction) and the height direction (focusing direction) with respect to the sliding shaft 25.

SUMMARY OF THE INVENTION

Recently, there has been adopted a method of increasing the number of rotation of an optical disc so as to increase the data transfer rate from an optical disc apparatus, and it has become more and more necessary to enhance the follow-up property (responsibility) of the objective lens of the objective lens driving device to the plane vibration and the track eccentricity of the recording surface of the optical disc. Particularly, the acceleration of distortion due to the eccentricity of the track is rapidly increased because it is proportional to the square of the number of rotation, and thus the follow-up performance of the objective lens in the tracking direction is required to be enhanced. A method for intensifying the electromagnetic force of the coil in a gap of a magnetic circuit may be considered to enhance the follow-up performance of the objective lens. In order to intensify the electromagnetic force of the coil, the effective portion of the coil in the gap of the magnetic circuit may be lengthened. However, in the objective lens driving device shown in FIGS. 9 to 11, the lowermost portion of the tracking coil 4 in the sliding axis direction is set to be equal to the lowermost portion of the focusing coil 5 in height. Therefore, in order to prevent the optical beam 8 from being intercepted by the coil when the effective portion of the coil is lengthened, it is necessary that the optical beam 8 is disposed so as to pass over the lower side of the focusing coil 5 and the tracking coil 4 in the sliding shaft direction, or incident from the optical axis direction of the objective lens 7. Consequently, the objective lens driving device is bulky, and thus the optical disc apparatus must be designed in a large size. Further, the optical disc apparatus is also required to be compact in addition to the requirement of the enhancement of the follow-up performance of the objective lens of the objective lens driving device to the plane vibration and the track eccentricity of the recording surface of the optical disc. Therefore, the objective lens driving device is required to be thin and compact. According to the first objective lens shown in FIGS. 9 to 11 of the first prior art, if the follow-up performance of the objective lens is enhanced, the objective lens driving apparatus would be bulky (thick). That is, it is impossible to satisfy both the requirement for the enhancement of the follow-up performance of the objective lens and the requirement for the thin (low-profile) and compact design of the objective lens driving device.

According to the present invention, an objective lens driving device comprises a movable unit having an objective lens for focusing an optical beam onto an optical disc, a focusing coil for driving the objective lens in an optical axis direction thereof, a tracking coil for driving the objective lens in a radial direction of the optical disc and a lens holder for holding the objective lens, the focusing coil and the tracking coil, a sliding shaft which is provided substantially in parallel to the optical axis direction of the objective lens and adapted to guide the movable unit, a magnetic circuit for generating magnetic flux which is applied to the focusing coil and the tracking coil, and a mirror for converting the optical beam in the optical axis direction of the objective lens, wherein the tracking coil is disposed outside the objective lens in the radial direction with respect to the sliding shaft, and the whole or part of the optical beam incident to the mirror passes through a space surrounded by the tracking coil and the focusing coil which are adjacent to each other, thereby achieving both the enhancement of the follow-up performance to the optical disc and the thin and compact design of the objective lens driving device.

Recently, the standards of optical discs which have high recording density and are different in substrate thickness have been announced, and they have just started to require optical disc apparatuses which can reproduce not only CDs and CD-ROMs, but also these optical discs having high recording density. Therefore, in order to match both the two types of optical discs which have different recording density or substrate thickness, there may be considered such a type of objective lens driving device that two kinds of objective lens corresponding to the respective types of optical discs are provided and the objective lens being used is switched in accordance with the type of optical disc. In this case, if the magnetic circuit and the positioning mechanism of the objective lens driving device shown in FIGS. 12 and 13 is used, the coil, the magnet and the magnetic substance must be disposed on the same circumference to form a magnetic circuit, and thus the objective lens driving device must be designed in a large shape. Further, it is difficult to use the magnetic circuit commonly, and the number of parts can be expected to increase because these parts must be used exclusively.

The present invention has been implemented in order to solve the above problems, and has an object to provide an objective lens driving device having an objective lens switching mechanism in which the positioning of the objective lens in a focusing direction and a tracking direction can be performed with high reproducibility and high precision even after the objective lens is switched to another, and which can also reduce the number of parts to lower the cost.

Therefore, the objective lens driving device according to the present invention is adapted to the two types of optical discs which are different in recording density, and it includes two types of objective lens which are respectively adapted to focus an optical beam onto an optical disc and are matched with the two types of optical discs, a lens holder for holding a focusing coil and tracking coils for driving the objective lens in the focusing and tracking directions and magnetic substances, and a sliding shaft for sliding and rotating the lens holder in the focusing direction and the tracking direction. Further, the objective lens driving device is provided with a magnet and a yoke which are fixed to confront the coils and keep a magnetic gap to thereby apply magnetic flux to the coils, and the magnetic substances are radially disposed out of the magnetic gap on a plane perpendicular to the plane defining the magnetic gap, whereby a magnetic spring is constituted by leakage flux of the magnetic circuit.

In general, the objective lens driving device is provided with current supply means such as FPC or the like for supplying current to the movable portion comprising the lens holder, the coils, etc. In the objective lens driving device having the objective lens switching mechanism, the current supply means is greatly bent in an interlocking manner with the objective lens switching operation. The restoring force of the current supply means from the bent state to the initial state acts on the movable portion in proportion to the switching amount of the objective lens. Therefore, as the objective lens switching angle is set to a larger value in order to further miniaturize the objective lens driving device, the effect of the restoring force by the current supply means becomes less negligible as comparison with the restoring force of the magnetic spring to the neutral position, and the precision of the positioning of the objective lens is lowered.

The present invention has been implemented to solve the above problem, and has an object to suppress the lowering of the positioning precision of the objective lens using the restoring force of the current supply means in the objective lens driving device which is provided with plural objective lens and an objective lens switching mechanism.

In order to solve the above problem, according to the present invention, an objective lens driving device includes plural objective lenses for focusing an optical beam, a lens holder for holding the objective lenses, a focusing coil which is provided in the lens holder to drive the objective lenses in a focusing direction, tracking coils which are provided in the lens holder to drive the objective lenses in a tracking direction, a sliding shaft for guiding the lens holder slidably, and rotatably, and a yoke and plural magnets for forming a magnetic circuit having a magnetic gap in which the focusing coil and the tracking coils are inserted, wherein magnetic substances are disposed or formed on the lens holder in a radial direction with the sliding shaft located at the rotational center, and the angles at which the respective objective lenses are located around the shaft center of the sliding shaft (i.e., the location angles of the objective lens with the shaft center of the sliding shaft) is set to be varied with respect to the location angles of the magnetic substances around the shaft center of the sliding shaft.

DETAILED DESCRIPTION OF THE PREFERRED EMBODIMENTS

Preferred embodiments according to the present invention will be described hereinafter with reference to the accompanying drawings.

A first embodiment of an objective lens driving device according to the present invention will be described first.

Figure 1:
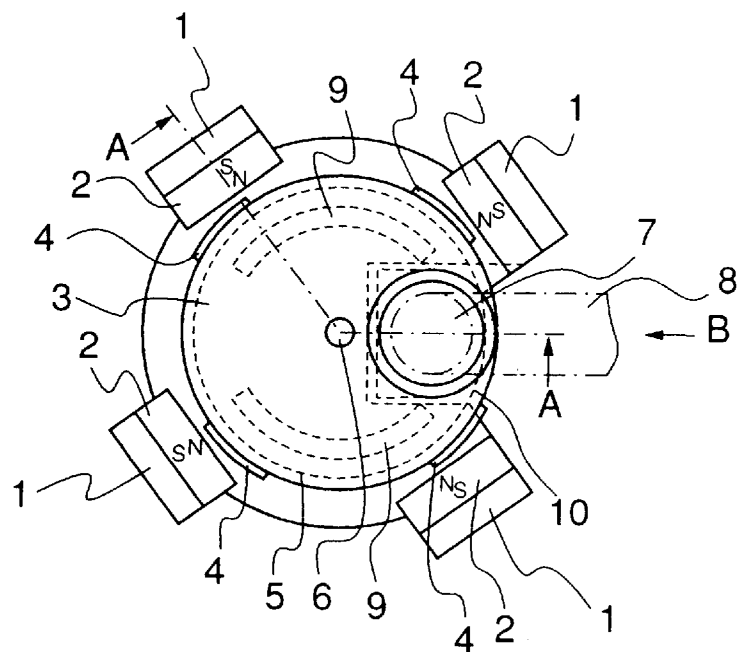
FIG. 1 is an explanatory configuration diagram showing a first embodiment of an objective lens driving device according to the present invention.
Figure 2:
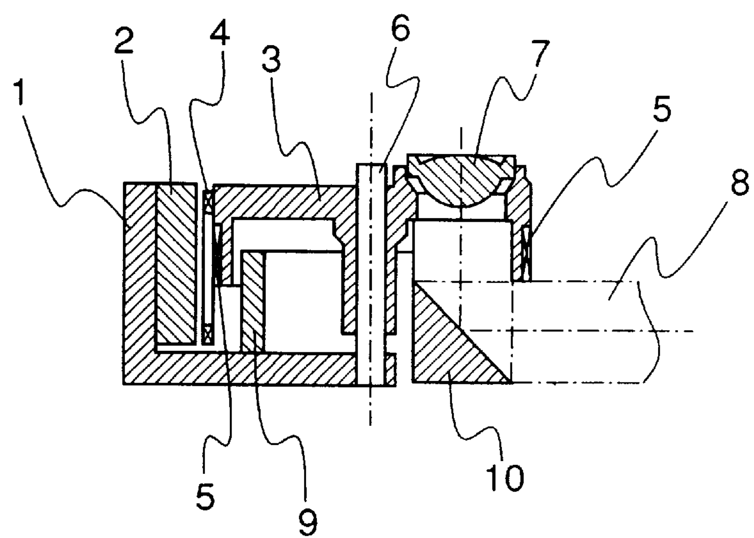
FIG. 2 is a cross-sectional view of the configuration of the objective lens driving device which is taken along a line A—A line of FIG. 1.
Figure 3:
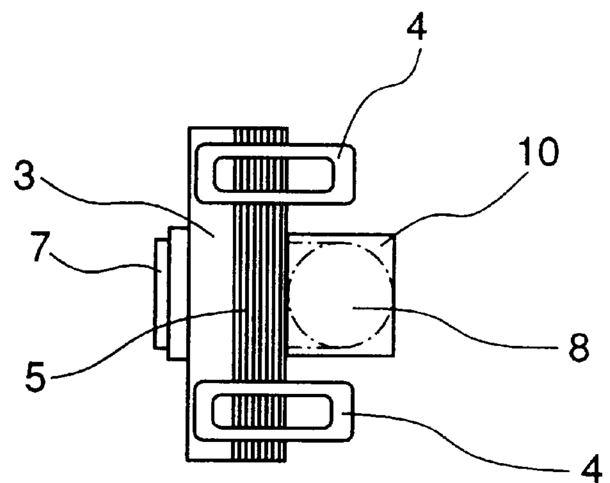
FIG. 3 is an explanatory configuration diagram showing the objective lens driving device which is viewed from the direction of an arrow B of FIG. 1.

FIG. 1 is a configuration diagram showing a first embodiment of an objective lens device according to the present invention. FIG. 2 shows a cross-section of FIG. 1 along a line A—A. FIG. 3 is a drawing showing the objective lens driving device which is viewed from the direction of an arrow B of FIG. 1.

In FIG. 1, one objective lens 7 is provided in a lens holder 3, and the lens holder 3 is supported and guided by a sliding shaft 6 which is slidably and rotatably disposed substantially in parallel to the optical axis direction of the objective lens 7. A focusing coil 5 is wound around the outer peripheral surface of the lens holder 3, and tracking coils 4 are provided substantially coaxially at angular intervals of substantially 90° on the outer peripheral portion of the lens holder 3. At this time, the lowermost portions of the tracking coils 4 are disposed so as to be nearer to a mirror 10 than the lowermost portion of the focusing coil 5 as shown in FIGS. 2 and 3. Further, a magnetic circuit comprising magnets 2, outer yokes 1 and inner yokes 9 is provided to generate magnetic flux so that the magnetic flux traverses the tracking coils 4 and the focusing coil 5.

In the above constitution, at least one part of the optical beam 8 passes through the space which is surrounded by the tracking coils 4 and the focusing coil 5 which are partially adjacent to each other (in another aspect, the space within the dimension of the tracking coils in the optical direction of the objective lens), and then becomes incident to the mirror 10 by which the optical path is deflected in the optical axis direction of the objective lens 7.

In the focusing control operation, by causing the current to flow into the focusing coil 5 in the forward or reverse direction, the electromagnetic force acts in the direction of the sliding shaft 6 in the gap of the magnetic circuit to drive the objective lens 7 in the optical axis direction in accordance with the plane vibration of the recording surface of the optical disc, whereby the spot of the optical beam 8 can follow the recording surface of the optical disc. Further, in the tracking control operation, by causing the current to flow into each tracking coil 4 in the forward or reverse direction, the electromagnetic force acts as a rotational couple of force around the sliding shaft 6 in the gap of the magnetic circuit, whereby the spot of the optical beam 8 can follow the eccentricity of the track of the optical disc. As the length of the effective portion of the tracking coil 4 in the gap of the magnetic circuit, that is, the height of the tracking coil 4 in the direction of the sliding shaft is increased, the driving force of the tracking coil 4 is stronger. This effect enables the objective lens 7 to follow the eccentricity of the track of the optical disc of the objective lens driving device.

As described above, in the objective lens driving device according to this embodiment, the lowermost portions of the tracking coils 4 are set to be lower than the lowermost portion of the focusing coil in the direction of the sliding shaft, and a part of the optical beam 8 is passed through the space surrounding the neighboring tracking coil 4 and the focusing coil 5 from the side surface of the objective lens driving device to enable the objective lens driving device to be designed in a low-profile (thin) design. Further, the effective portion of the tracking coil 4 which intersects the magnetic flux can be kept long, so that the driving force can be magnified, and the follow-up performance during the high-speed rotation of the optical disc can be enhanced.

Next, a second embodiment of the objective lens driving device according to the present invention will be described.

Figure 4:
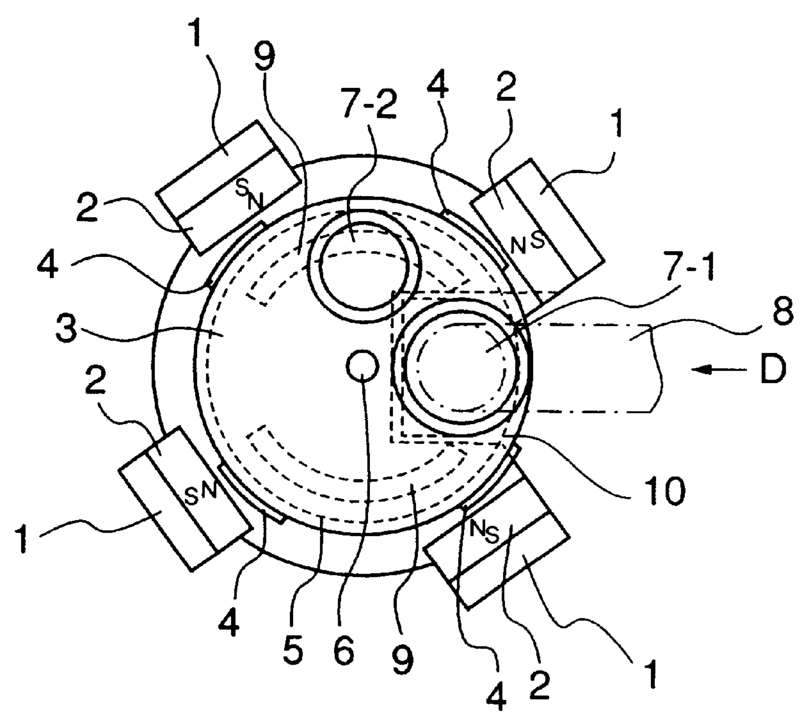
FIG. 4 is an explanatory configuration diagram showing a second embodiment of the objective lens driving device according to the present invention.
Figure 5:
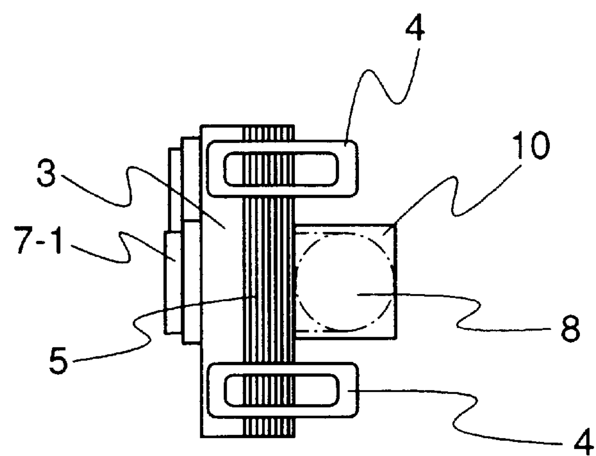
FIG. 5 is an explanatory configuration diagram showing the objective lens driving device which is viewed from the direction of an arrow D of FIG. 4.
Figure 6:
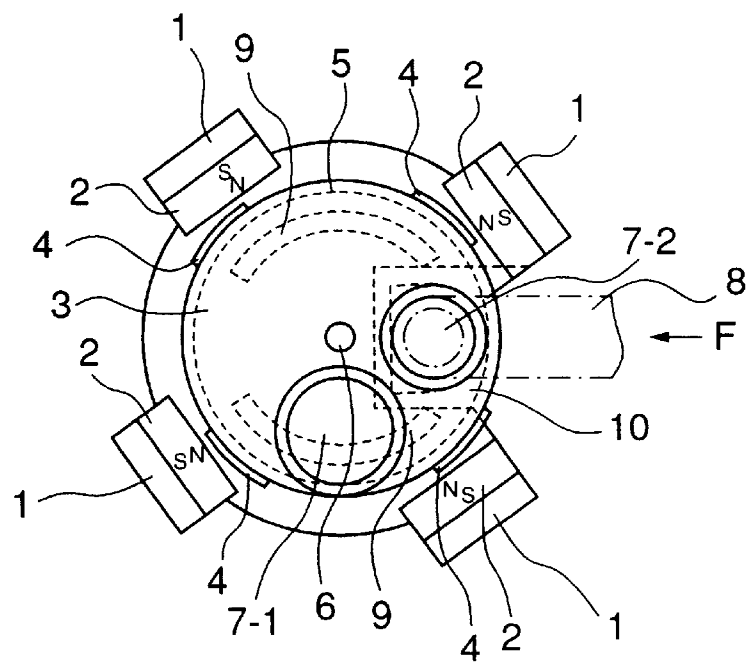
FIG. 6 is a diagram showing the state of the objective lens driving device of the second embodiment.
Figure 7:
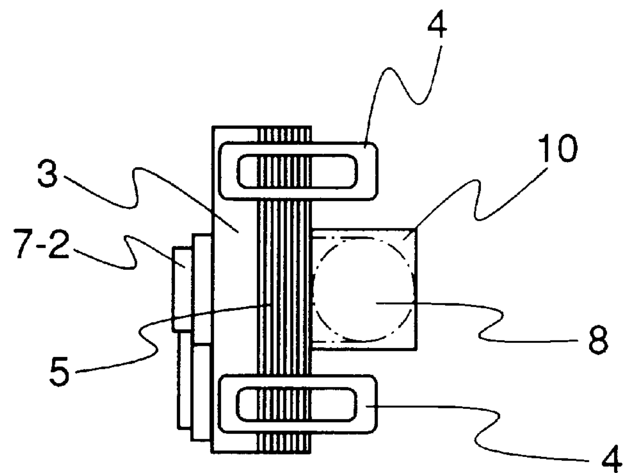
FIG. 7 is an explanatory configuration diagram showing the objective lens driving device which is viewed from the direction of an arrow F of FIG. 6.

FIG. 4 is an explanatory configuration diagram showing the construction of a second embodiment, FIG. 5 is a diagram which is viewed from the direction of an arrow D of FIG. 4, FIG. 6 is a state diagram of this embodiment, and FIG. 7 is a diagram which is viewed from the direction of an arrow F of FIG. 6.

As shown in FIG. 4, this embodiment is different from the first embodiment in that a first objective lens 7-1 and a second objective lens 7-2 are provided in the lens holder 3 substantially at angular intervals of 90°. The other construction is the same as the first embodiment, and thus the description thereof is omitted. In FIGS. 4 to 7, the first objective lens 7-1 and the second objective lens 7-2 are provided to conform to two different types of optical discs (for example, DVD and CD), respectively. By switching the objective lens in accordance with the type of the optical disc, different types of optical discs can be supported by only one objective lens driving device. The switching operation of the objective lens is carried out by causing pulsed current to flow into the tracking coils 4. FIG. 4 shows the state where the first objective lens 7-1 which conforms to one (for example, DVD) of the two types of optical discs is selected, and FIG. 6 shows the state where the second objective lens 7-2 which conforms to the other optical disc (for example, CD) of the two types of optical discs is selected. As shown in FIGS. 5 and 7, as in the case of the first embodiment, in a condition where any of the objective lenses are selected by switching of the first objective lens and the second objective lens in accordance with the type of the optical disc, a part of the optical beam 8 can be passed through the space surrounded by the neighboring tracking coils 4 and focusing coil 5 from the side surface of the objective lens driving device, and thus the objective lens driving device can be designed in a low-profile structure. Further, the effective portion of the tracking coil which intersects the magnetic flux can be kept long, so that the driving force can be magnified and the follow-up performance during the high-speed rotation of the optical disc can be enhanced as in the case of the first embodiment.

Next, a third embodiment of the objective lens driving device according to the present invention will be described.

Figure 8:
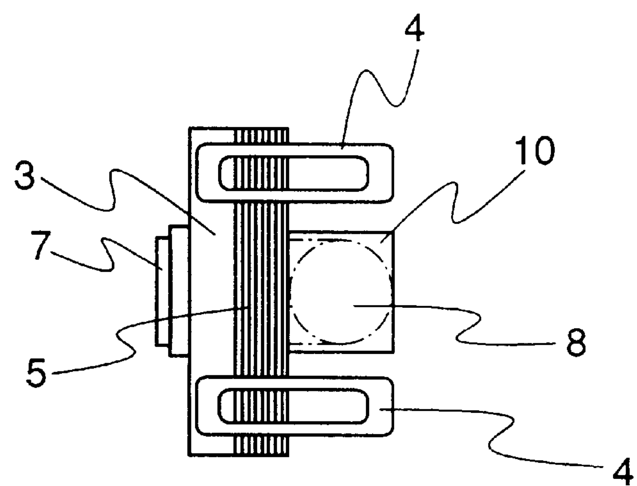
FIG. 8 is an explanatory configuration diagram showing a third embodiment of the objective lens driving device according to the present invention.
Figure 9:
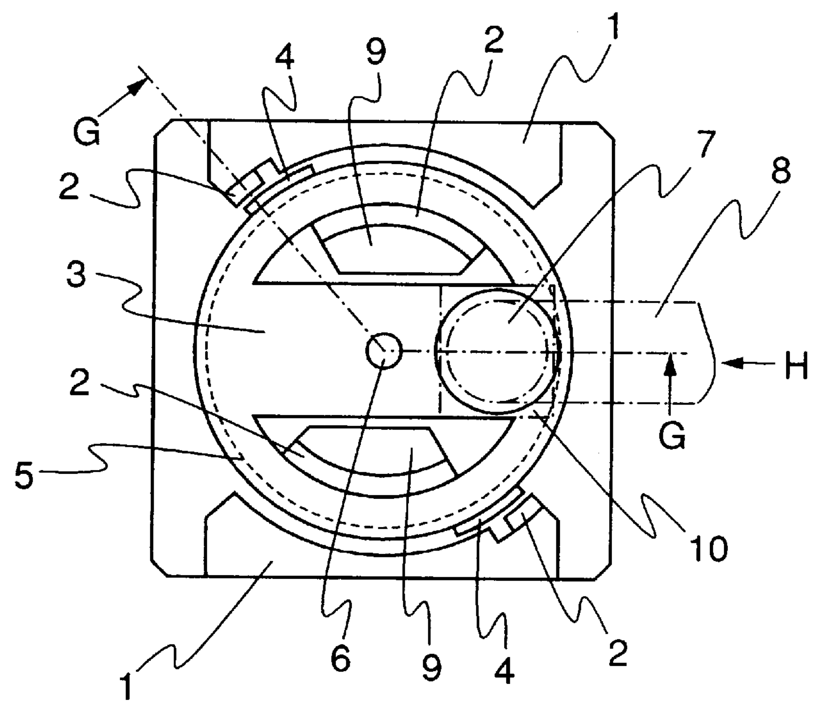
FIG. 9 is an explanatory configuration diagram showing a conventional objective lens driving device.
Figure 10:
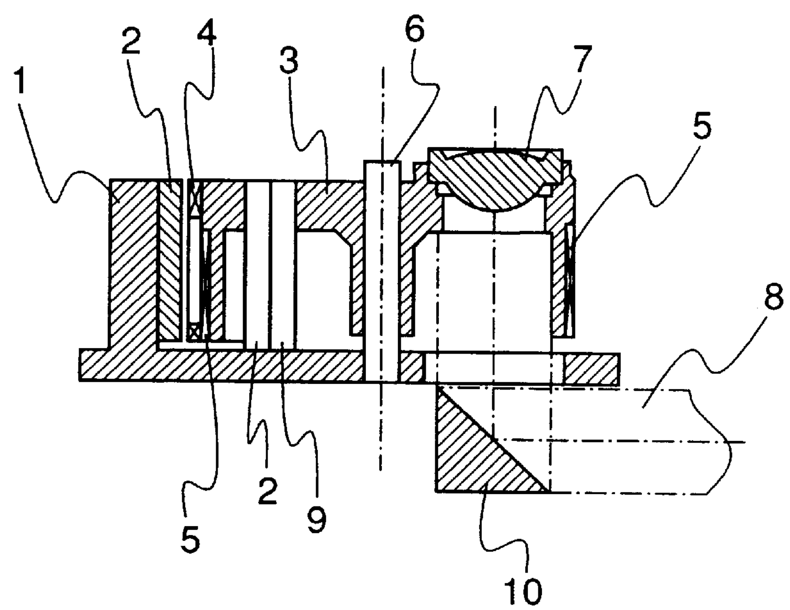
FIG. 10 is a cross-sectional view which is taken along a line G—G of FIG. 9.
Figure 11:
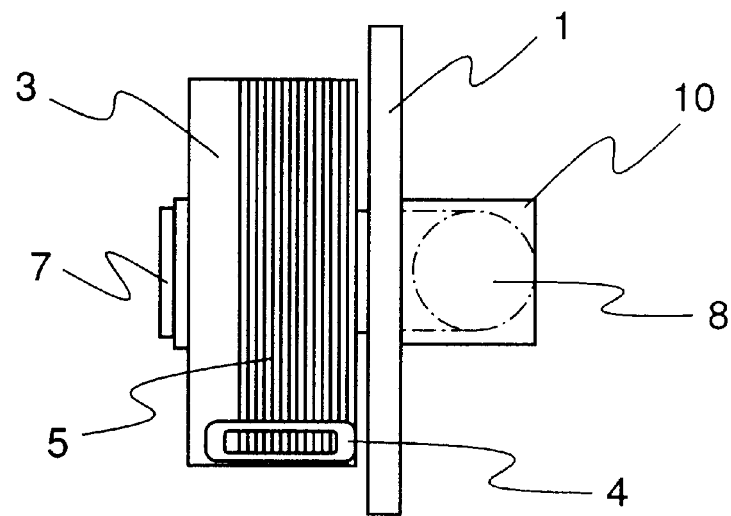
FIG. 11 is an explanatory configuration diagram of the conventional objective lens driving device which is viewed from the direction of an arrow H of FIG. 9.
Figure 12:
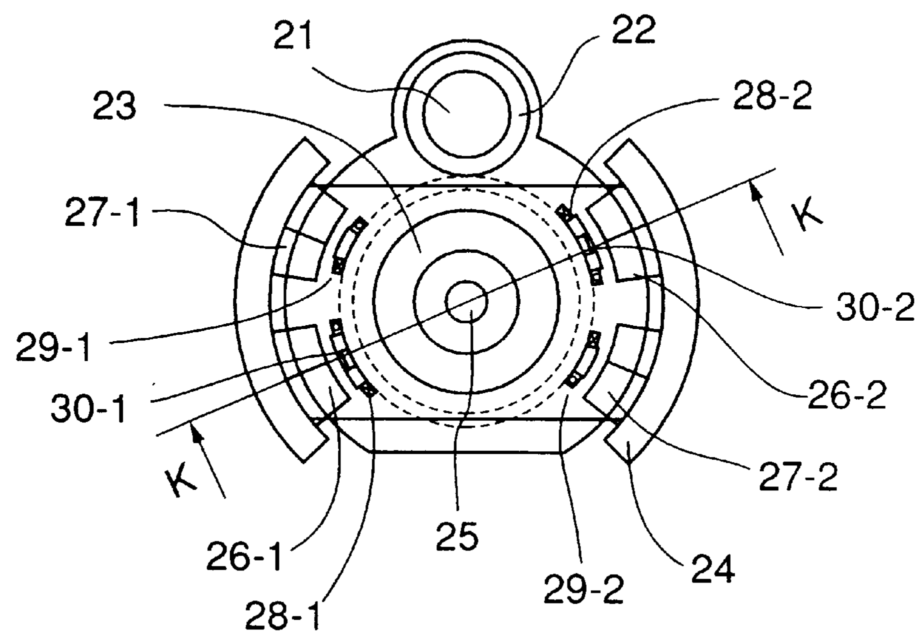
FIG. 12 is an explanatory configuration diagram showing another conventional objective lens driving device.
Figure 13:
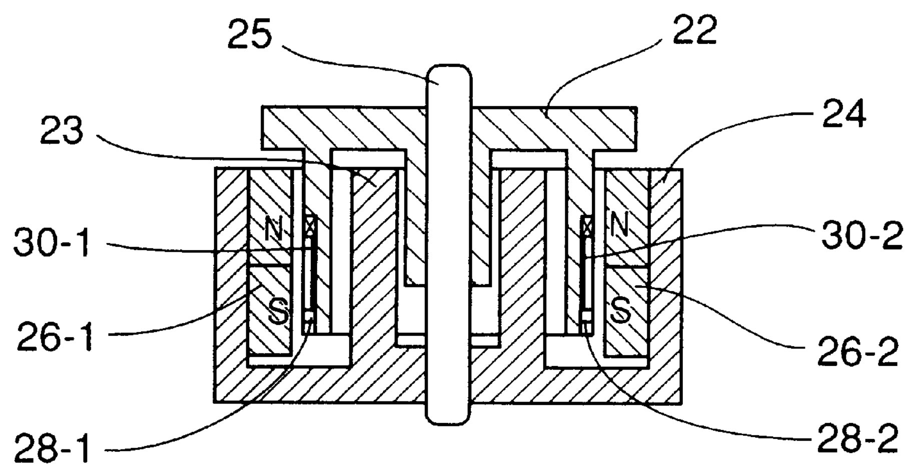
FIG. 13 is a cross-sectional view which is taken along a line K—K of FIG. 12.

FIG. 8 is a diagram showing the third embodiment according to the present invention. The main construction of the third embodiment is the same as the first embodiment, but, the third embodiment is different in the first embodiment in that the overall optical beam 8 is passed from the side surface of the objective lens driving device through the space which is surrounded by the tracking coils 4 and the focusing coil 5 which are adjacent to each other. The overall optical beam 8 can be passed from the objective lens driving device through the space surrounded by the tracking coils 4 and the focusing coil 5 which are adjacent to one another as in the case of the first embodiment, and thus the objective lens driving device can be designed in a low-profile (thin) structure. Further, the effective portion of the tracking coils 4 which intersect the magnetic flux can be kept long, so that the driving force can be magnified and the follow-up performed during the high-speed rotation of the optical disc can be enhanced. The same effect as the first embodiment can be obtained in the third embodiment. Further, as in the case of the second embodiment, both the first and second objective lenses can be provided on the lens holder in the third embodiment, so that the same effect as the second embodiment can be obtained.

As described above, according to the present invention, the whole or a part of the optical beam 8 can be passed through the space surrounded by the tracking coils 4 and the focusing coil 5 which are fixed to the lens holder 3 and adjacent to each other, whereby the enhancement of the follow-up of the objective lens to the optical disc and the thin and compact design of the objective lens driving device can be performed at the same time.

Next, a fourth embodiment of the objective lens driving device according to the present invention will be described.

Figure 14:
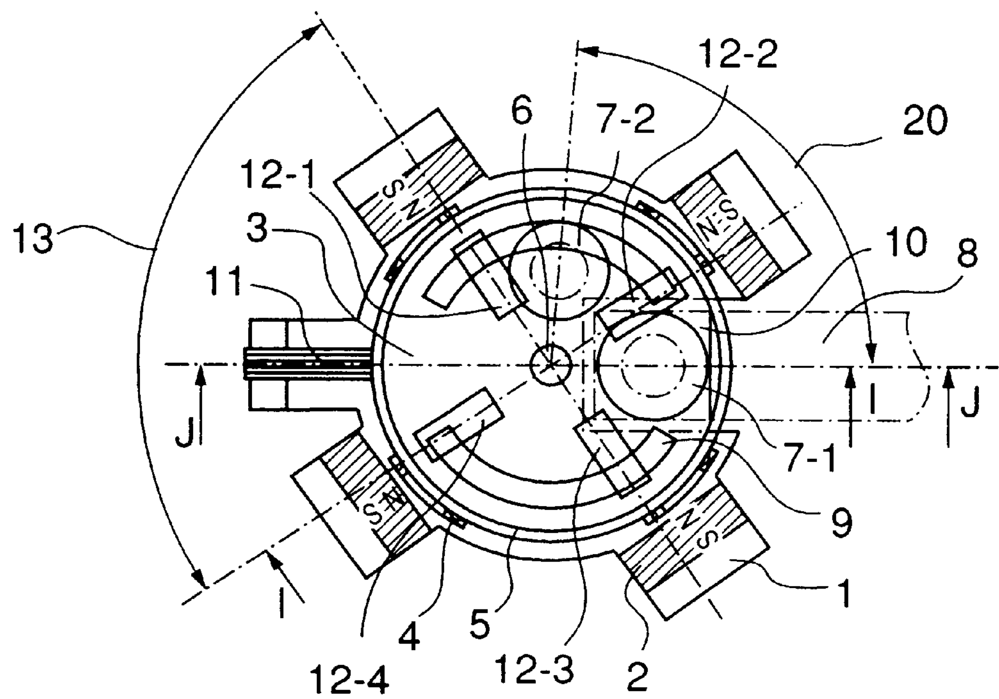
FIG. 14 is an explanatory configuration diagram showing fourth and seventh embodiments of the objective lens driving device according to the present invention, and shows the state where a first objective lens 7-1 corresponding to one of two types of optical discs is selected.
Figure 15:
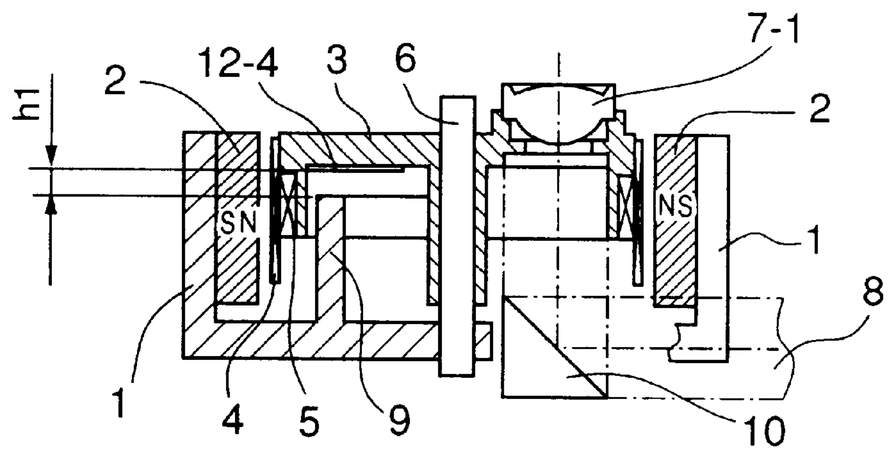
FIG. 15 is a cross-sectional view which is taken along a line I—I line of FIG. 14.
Figure 16:
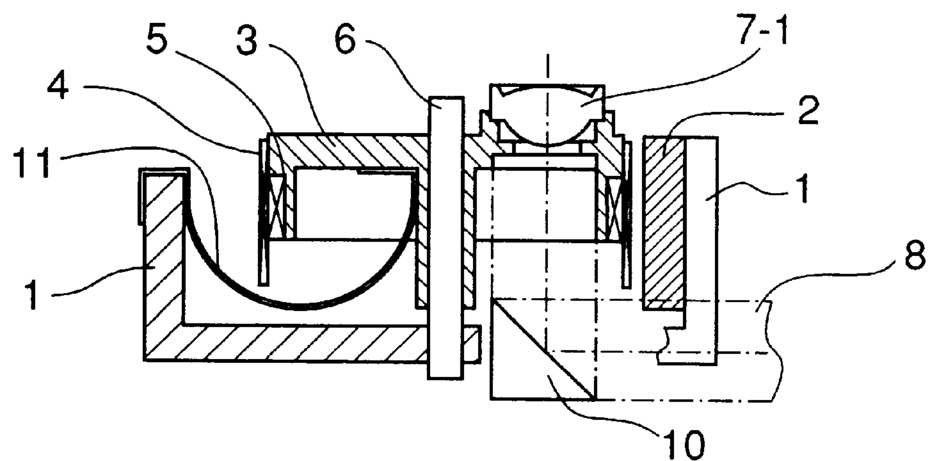
FIG. 16 is a cross-sectional view which is taken along a line J—J of FIG. 14.
Figure 17:
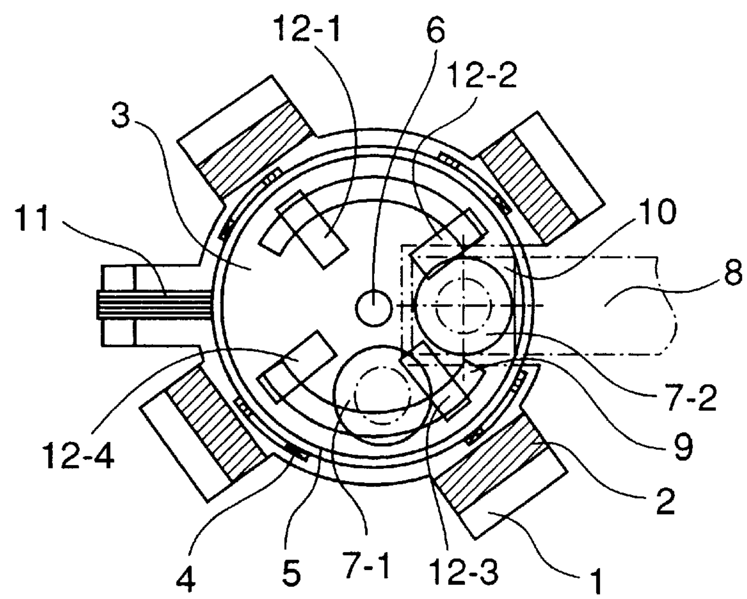
FIG. 17 is a diagram showing the fourth and seventh embodiments of the objective lens driving device of the present invention, and shows the state where a second objective lens 7-2 corresponding to the other of the two types of optical discs is selected.

FIG. 14 is an explanatory configuration diagram showing the objective lens driving device of the fourth embodiment, and shows the state where the first objective lens 7-1 which conforms to one of the two types of optical discs is selected. FIG. 15 is a cross-sectional view which is taken along a line I—I of FIG. 14, FIG. 16 is a cross-sectional view which is taken along a line J—J of FIG. 14, and FIG. 17 shows the state where the second objective lens 7-2 which conforms to the other optical disc of the two types of optical discs is selected.

In FIGS. 14 to 17, reference numeral 1 represents an outer yoke, reference numeral 2 represents a magnet, reference numeral 3 represents a lens holder, reference numeral 4 represents a tracking coil, reference numeral 5 represents a focusing coil, reference numeral 6 represents a sliding shaft, reference numeral 7-1 represents a first objective lens, reference numeral 7-2 represents a second objective lens, reference numeral 9 represents an inner yoke, and reference numerals 12-1, 12-2, 12-3, 12-4 represent magnetic substances.

The lens holder 3 in which the first objective lens 7-1 and the second objective lens 7-2 are held substantially at angular intervals of 90° is freely rotatably and slidably secured to the sliding shaft 6. The lens holder 3 holds one focusing coil 5 for driving the objective lens in the height direction to the sliding shaft 6, and four tracking coils 4 which are disposed substantially at four angular intervals of 90° and adapted to drive the objective lens in the rotational direction, and further holds four magnetic substances 12-1 to 12-4 each formed of a rectangular plate so that these magnetic substances are arranged in the radial direction to the shaft center of the sliding shaft 6 and substantially at angular intervals of 90°, thereby constituting a movable unit.

The inner yokes 9 are fixed on the inner peripheral sides of the focusing coil 5 and the tracking coils 4, and the magnets 2 which are magnetized to have unipolarity and the yokes 1 are disposed substantially at an angular interval of 90° are fixed at the outer peripheral sides of the focusing coil 5 and the tracking coils 4, thereby constructing the magnetic circuit which forms a magnetic loop of the magnet 2→the tracking coil 4→the focusing coil 5→the inner yoke 9→the outer yoke 1→the magnet 2, to apply magnetic flux to both the coils. The inner yoke 9 is provided with a notch portion to guide the optical beam 8 to the first objective lens 7-1 or the second objective lens 7-2, and the optical beam 8 is passed through the notch portion of the inner yoke 9. Further, in order to make the magnetic circuit symmetrical, a notch portion is also provided on the inner yoke portion at the opposite side. Here, the magnetic substances 12-1 to 12-4 are held at the upper side of the inner yokes 9 and on the lower surface of the lens holder 3.

In the magnetic circuit thus constructed, the magnetic flux density distribution in the rotational direction (tracking direction) at the upper side of the inner yoke 9 which confronts the magnet 2 becomes maximum at the center portion of the magnet 2. Accordingly, each of the magnetic substances 12-1 to 12-4 which are disposed substantially radially are attracted toward the center of the corresponding magnet 2. Therefore, the magnetic substances are magnetically balanced under the positional relationship as shown in FIG. 14, so that the first objective lens 7-1 and the second objective lens 7-2 can be positioned stably in the rotational direction (tracking direction). Further, the positioning precision can be more enhanced by forming each of the magnetic substances 12-1 to 12-4 integrally with the lens holder 3.

Figure 25:
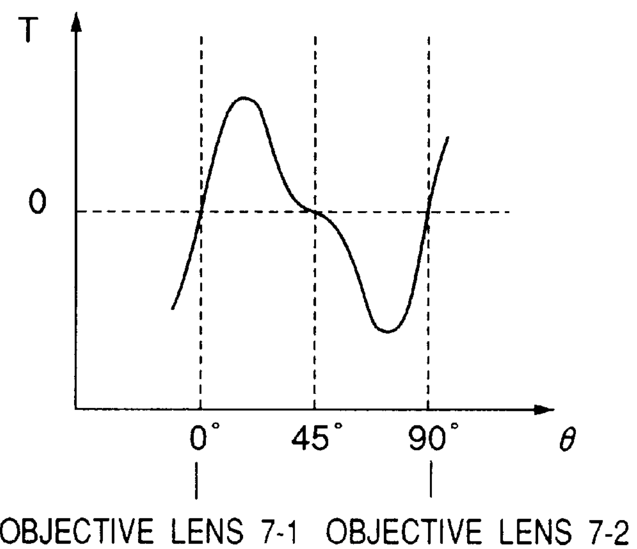
FIG. 25 is an explanatory diagram showing necessary torque in the tracking direction in the objective lens driving device of FIG. 14.

FIG. 25 shows the relationship between the rotational angle θ of the lens holder 3 and the torque T which is needed to rotate the lens holder 3 of the fourth embodiment. The state of FIG. 14 corresponds to such a condition that the rotational angle on the abscissa is equal to 0°, and the state of FIG. 17 corresponds to such a condition that the objective lens is switched to the second objective lens 7-2 and the rotational angle is equal to 90°. An area in which the rotational angle is about 45° corresponds to an unsteady area where the sign of the torque is inverted. If the rotational angle exceeds this unsteady area, the next magnetic substance piece is attracted and the stable magnetic balance is established again at the position where the rotational angle is equal to 90°.

Accordingly, by supplying the current to the tracking coils 4 in a pulse form to rotate the lens holder 3 by 45° or more, according to the relationship in force shown in FIG. 25, the objective lens is switched from the state of FIG. 14 where the first objective lens 7-1 is selected, to the state of FIG. 17 where the second objective lens 7-2 is selected, whereby the switching operation can be performed with high reliability. In addition, the positioning can be performed with high precision. Here, by changing the thickness of the magnetic substances 12-1 to 12-4 arranged in a cross, the spring constant of the magnetic spring which is expressed by the gradient of a linear portion of FIG. 25 can be changed.

Figure 26:
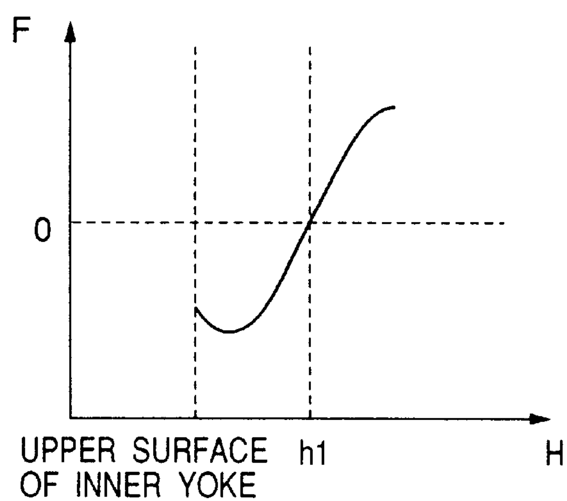
FIG. 26 is an explanatory diagram showing the force in the focusing direction in the objective lens driving device of FIG. 14.

FIG. 26 shows the relationship between a force required to slide the lens holder 3 in the focusing direction and the height of the lens holder 3. The abscissa represents the height H of the lens holder 3, and the ordinate represents the needed force F.

When the magnetic substances 12-1 to 12-4 and the magnets 2 are located in the same positional relationship shown in FIG. 14, the magnetic substances 12-1 to 12-4 are magnetically balanced in height h1. At this time, it has been experimentally proved that the relationship between the force F and the height (displacement) H varies linearly as in the case of the rotational direction, and the spring constant of the magnetic spring which is expressed by the gradient of the linear portion is dependent on the projection area of each piece of magnetic substance 12-1 to 12-4 in the sliding direction (focusing direction) of the lens holder 3. Accordingly, the shape of the magnetic substances 12-1 to 12-4 can be determined from the conditions of a servo system, etc.

Figure 27A:
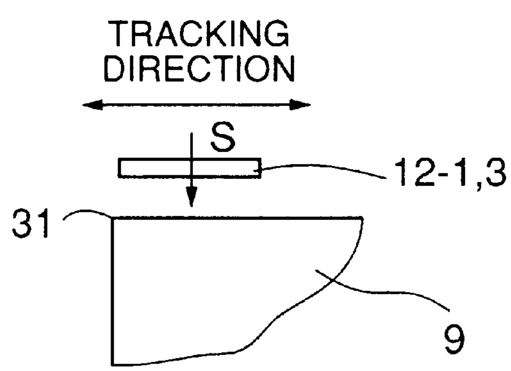
FIG. 27A is a diagram showing the shape of a notched end portion of an inner yoke.
Figure 27B:
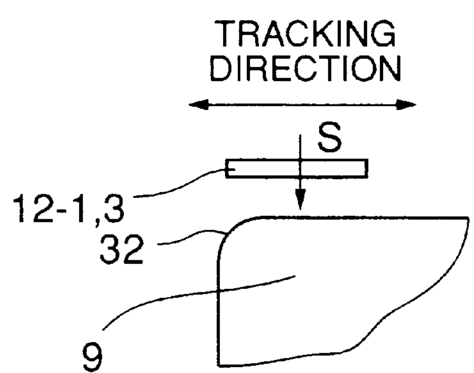
FIG. 27B is a diagram showing the shape of a notched end portion of an inner yoke.
Figure 28:
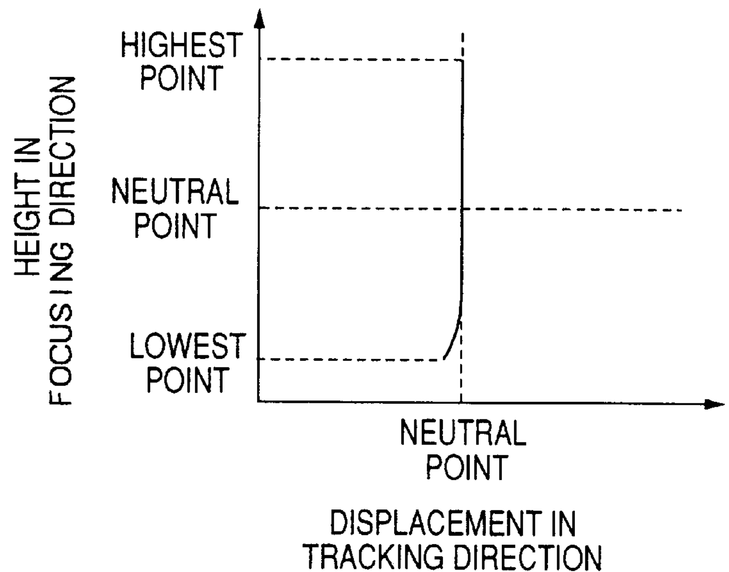
FIG. 28 is an explanatory diagram showing the effect of the height variation in the focusing direction on the displacement in the tracking direction in the objective lens driving device of FIG. 14.

The shapes of the inner yokes 9 which confront the magnetic substances 12-1, 12-2, 12-3, 12-4 are shown in FIG. 27A and FIG. 27B in the magnetic circuit of the fourth embodiment. In the magnetic circuit, if the corner portion 31 of the notch portion of the inner yoke 9 which confronts the magnetic substance 12-1, 12-2, 12-3, 12-4 is square-cornered as shown in FIG. 27A, the magnetic flux is liable to be concentrated on the ridgeline of the corner portion 31 to increase the magnetic flux density there. At this time, when the lens holder 3 is slid in the focusing direction to approach the magnetic substances 12-1, 12-2, 12-3,12-4 to the corner portion 31 of the notch portion of the inner yoke 9, the magnetic substances 12-1, 12-3 which are nearest to the corner portion 31 are attracted to the corner portion of the inner yokes 9 having high magnetic flux density as indicated by an arrow S, although its attraction level is small. FIG. 28 is a diagram showing this phenomenon. In FIG. 28, the ordinate represents the height of the lens holder 3 in the focusing direction, and the abscissa represents the displacement in the tracking direction of the lens holder 3. It is found that as the height of the lens holder 3 in the focusing direction is lowered, the lens holder 3 is displaced in the tracking direction. The direction of the displacement corresponds to the direction in which the center lines of the magnetic substances 12-1, 12-3 are attracted to the corner portion 31 of the notch portion of the inner yoke 9. Occurrence of such a phenomenon intensifies external perturbations on the servo in the tracking direction.

Figure 29:
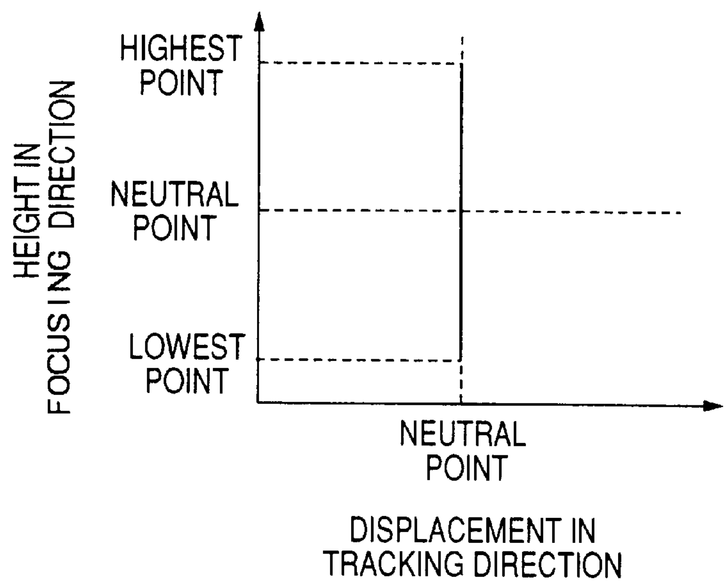
FIG. 29 is a diagram showing an improvement in characteristics of FIG. 28.

On the other hand, when the corner portion of the notch portion of the inner yoke 9 which confronts the magnetic substance 12-1, 12-2, 12-3, 12-4 is designed in an R (round) shape (R0 to R2) as shown in FIG. 27B, it has been experimentally found that the magnetic flux distribution around the rounded corner portion has a lower magnetic flux density as compared with that of the squared corner portion. Accordingly, even when the magnetic substance 12-1, 12-2, 12-3, 12-4 approaches to the R-shaped portion 32 of the notched portion of the inner yoke 9, the magnetic substances 12-1, 12-3 are not attracted to the R-shaped portion 32. FIG. 29 is a diagram showing this phenomenon. In FIG. 29, the ordinate represents the height of the lens holder 3 in the focusing direction, and the abscissa represents the displacement of the lens holder 3 in the tracking direction. By designing the corner portion of the notch portion of the inner yoke 9 in an R shape (R0 to R2) as shown in FIG. 27B, the lens holder 3 is only slightly displaced in the tracking direction even when it is vertically moved in the focusing direction. Therefore, according to this constitution, the high-precision tracking servo can be achieved, and the driving device having high reliability can be achieved.

Figure 27C:
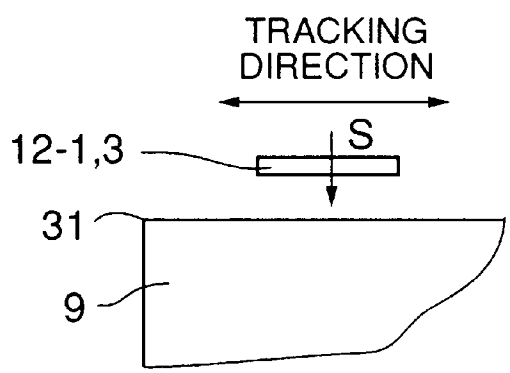
FIG. 27C is a diagram showing the shape of a notched end portion of an inner yoke.

Further, the same effect as shown in FIG. 29 can be obtained by sufficiently lengthening the inner yokes 9 confronting the magnetic substances 12-1, 12-2, 12-3, 12-4 to increase the overlap amount, that is, by designing the magnetic circuit so that the magnetic substances 12-1, 12-2, 12-3, 12-4 suffers no effect of the magnetic flux around the notch portion of the inner yokes 9 as show in FIG. 27C.

Figure 23:
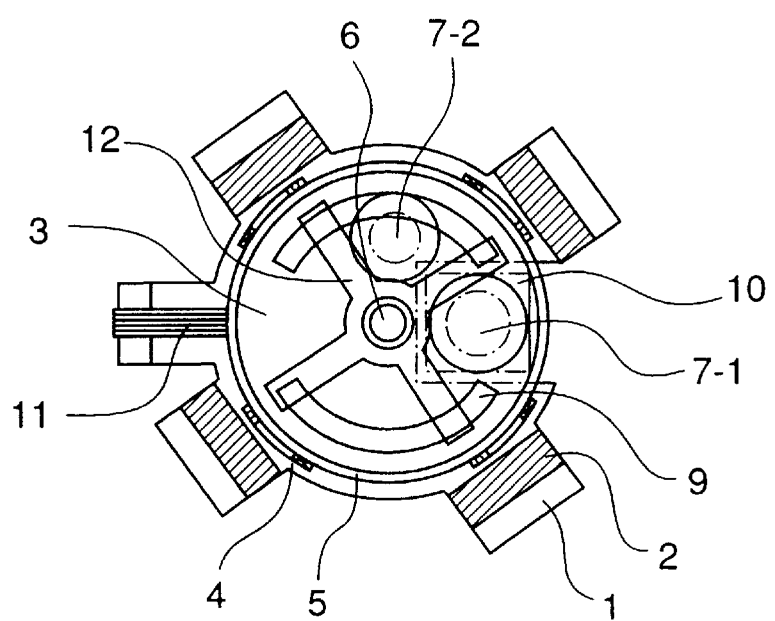
FIG. 23 is an explanatory configuration diagram showing fifth and ninth embodiments of the objective lens driving device according to the present invention, and shows the state where the first objective lens 7-1 corresponding to one of the two types of optical discs is selected.

FIG. 23 is an explanatory configuration diagram showing a fifth embodiment of the objective lens driving device according to the present invention, and shows the state where the first objective lens 7-1 which conforms to one of the two types of optical discs is selected. In FIG. 23, the same elements as the fourth embodiment are represented by the same reference numerals and the description thereof is omitted to avoid repetition.

The difference of the fifth embodiment from the fourth embodiment resides in that the fourth embodiment uses four magnetic substances 12-1 to 12-4, but, the fifth embodiment uses one substantially cross-shaped planar magnetic substance 12 in place of the four magnetic substances. Although the four magnetic substances 12-1 to 12-4 of the fourth embodiment are replaced by only one substantially cross-shaped planar magnetic substance 12 in this embodiment, the same effect as the fourth embodiment can be achieved and the number of pieces of magnetic substance can be reduced.

Figure 24:
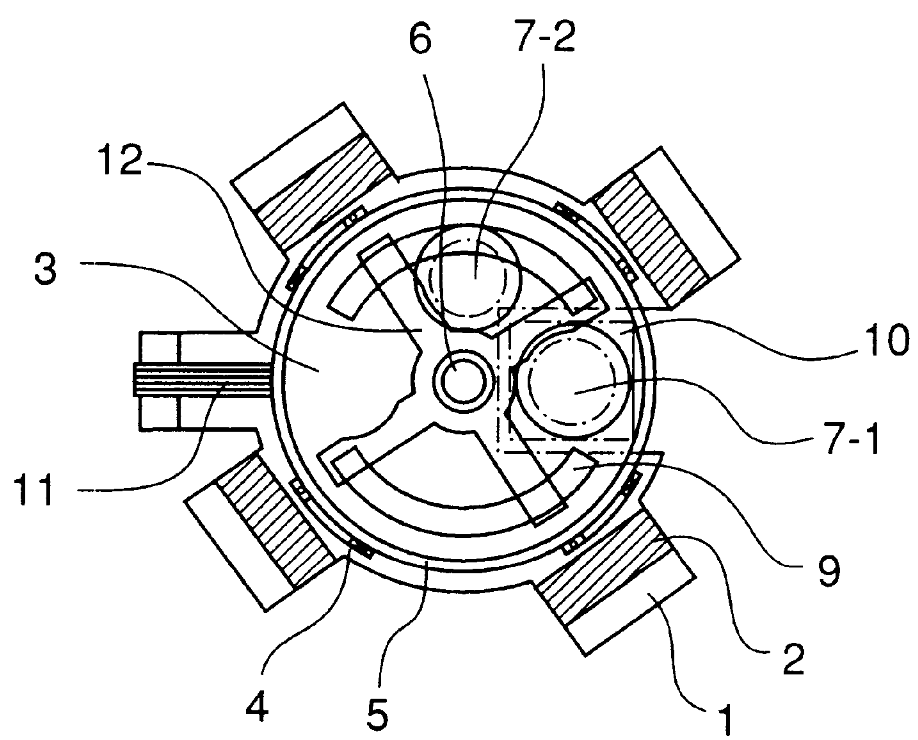
FIG. 24 is an explanatory configuration diagram showing sixth and tenth embodiments of the objective lens driving device according to the present invention, and shows the state where the first objective lens 7-1 corresponding to one of the two types of optical discs is selected.

FIG. 24 is a diagram showing a sixth embodiment of the objective lens driving device according to the present invention, and shows the state where the first objective lens 7-1 which conforms to one of the two types of optical discs is selected. In FIG. 24, the same components as the fifth embodiment are represented by the same reference numerals, and the description thereof is omitted to avoid repetition.

The construction of this embodiment is substantially identical to that of the fifth embodiment, but, this embodiment is different from the fifth embodiment in that a notch to keep a passage for an optical beam incident to the objective lens is provided for each of four pieces of the substantially cross-shaped magnetic substance 12 of this embodiment. With the construction of the sixth embodiment as described above, not only can the same effect as the fifth embodiment be achieved, but also an objective lens having a large aperture diameter which is suitably used for an optical disc having high recording density can be mounted without obstructing the compact design of the objective lens driving device.

If a notch for keeping a passage for an optical beam incident to the objective lens is provided for each of the four magnetic substances 12-1 to 12-4 in the fourth embodiment, an object lens having a large aperture diameter which is suitably used for an optical disc having high recording density can be mounted without obstructing the compact design of the objective lens driving device as in the case of the sixth embodiment.

As described above, according to the fourth to sixth embodiments, in the objective lens driving device having the switching mechanism for the two types of objective lens which conform to the two types of optical discs respectively, the magnetic substances are disposed within a plane perpendicular to the plane constituting the magnetic gap in a radial direction outside of the magnetic gap to form the magnetic spring by using the leakage magnetic flux of the magnetic circuit, whereby the objective lens in the focusing direction and the tracking direction can be reproduced with high reproducibility and high precision even after the switching operation of the objective lens is performed. Further, the number of parts can be reduced to lower the cost.

Next, a seventh embodiment according to the present invention will be described.

Figure 18:
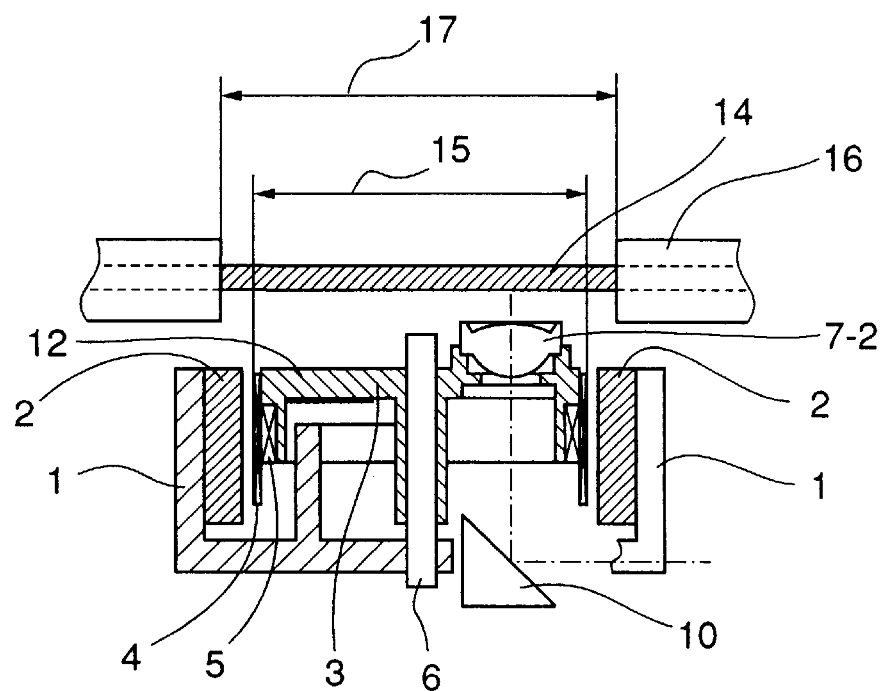
FIG. 18 is a cross-sectional view which is taken along a line I—I of FIG. 14, and shows the state where an optical disc mounted in a cartridge is used.
Figure 19:
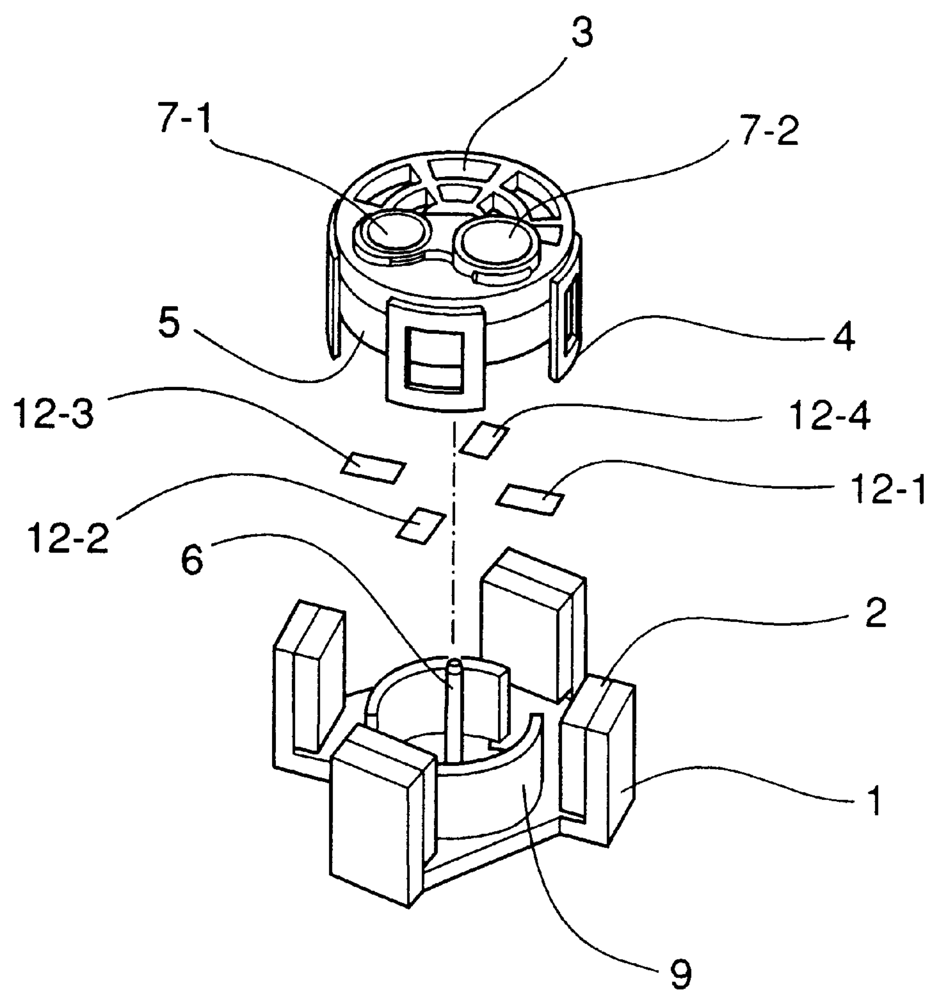
FIG. 19 is an exploded perspective view showing the fourth and seventh embodiments of the objective lens driving device according to the present invention.
Figure 20:
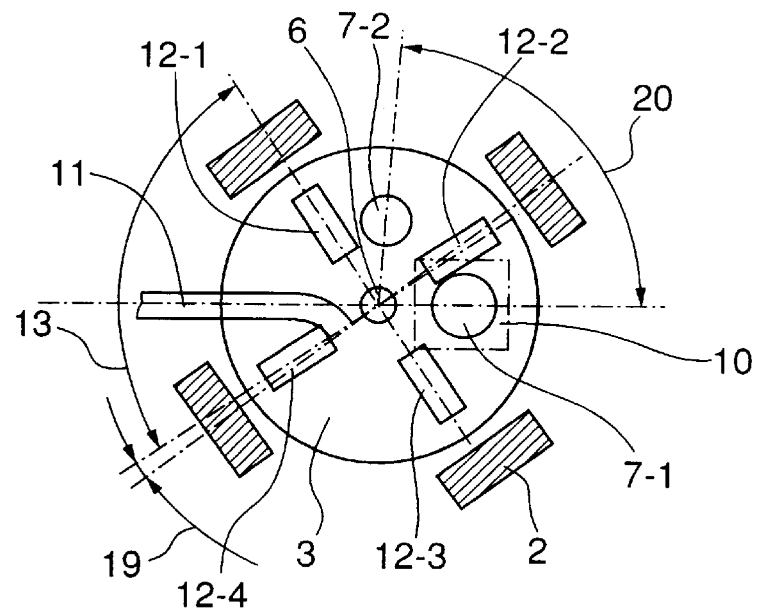
FIG. 20 is a diagram showing the state of the fourth and seventh embodiments of the objective lens driving device according to the present invention, and shows the state where the first objective lens 7-1 corresponding to one of the two types of optical discs is selected.
Figure 21:
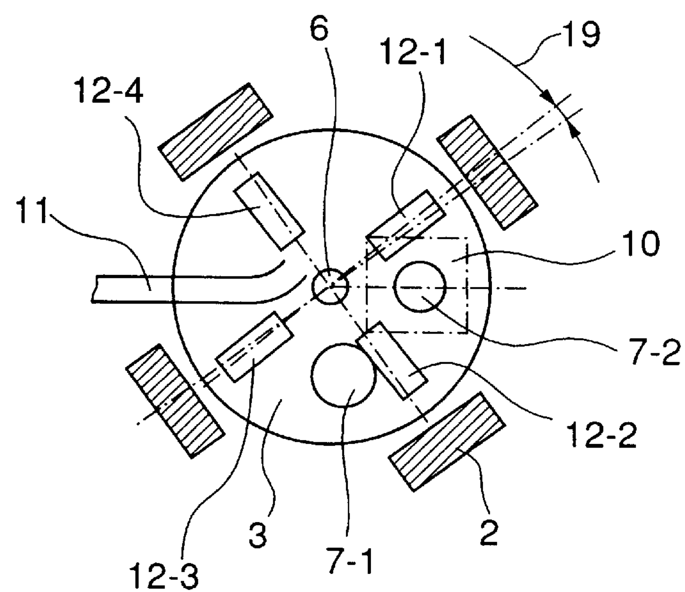
FIG. 21 is a diagram showing the fourth and seventh embodiments of the objective lens driving device according to the present invention, and shows the state where the second objective lens 7-2 corresponding to the other of the two types of optical discs is selected.

FIG. 14 is a diagram showing a seventh embodiment, and shows the state where the first objective lens 7-1 is selected. FIG. 15 is a cross-sectional view which is taken along a line I—I of FIG. 14, and FIG. 16 is a cross-sectional view which is taken along a line J—J of FIG. 14. FIG. 17 is an explanatory configuration diagram showing the state where the second objective lens 7-2 which is different from that of FIG. 14 is selected, and FIG. 18 is a cross-sectional view taken along a line I—I of FIG. 14 and shows the state where a cartridge contains an optical disc. FIG. 19 is an exploded perspective view showing this embodiment. FIG. 20 is a status diagram of this embodiment, and shows the state where the first objective lens 7-1 is selected. FIG. 21 is a diagram explaining a state where the second objective lens 7-2 is selected.

In FIGS. 14 to 19, the first objective lens 7-1, the second objective lens 7-2, the magnetic substance 12, the focusing coil 5 and the tracking coil 4 are mounted on the lens holder 3 which is freely slidable and rotatable around the sliding shaft 6, thereby forming the movable unit. The maximum length 15 of the movable unit is set to be smaller than the length of the corresponding cartridge open portion 17 as shown in FIG. 18, and the first objective lens 7-1 and the second objective lens 7-2 are disposed at a lens arrangement angle 20 around the shaft center of the sliding shaft 7-2. In this case, the objective lens arrangement angle 20 is set to be smaller than substantially 90°. The four magnetic substances 12-1 to 12-4 are radially disposed substantially at an angular interval of 90° around the shaft center of the sliding shaft 6. The outer yokes 1, the inner yokes 9 and the magnets 2 constitute a magnetic circuit. The focusing coil 5 and the four magnets 2 confronting the four tracking coils 4 are magnetized in the radial direction, and they are arranged substantially at the same arrangement angle 13 as the magnetic substances 12. The magnetic flux density distribution in the peripheral direction around the magnetic substances 12 is maximum at the center portion of the confronting magnets 2, and thus the magnetic substances 12 are magnetically balanced and stabilized around the position confronting the center of the magnets 2. Further, the magnetic substances 12 are magnetically balanced and stabilized at the upper sides of the inner yokes 9 so as to form a magnetic loop in which the magnetic flux in the height direction flows in the direction of the magnet 2→the magnetic substance 12→the inner yoke 9→the outer yoke 1→the magnet 2, whereby the overall movable unit, the first objective lens 7-1 and the second objective lens 7-2 are positioned stably and with high precision by the magnetic spring which is formed by the magnetic substances 12 and the magnetic circuit. FPC 11 links the outer yokes 1 and the movable unit so that the sectional shape is substantially U-shaped. By supplying a predetermined amount of current to the focusing coil 5 and the tracking coils 4 through the FPC 11, each coil in the magnetic circuit can obtain a driving force which is called "Fleming's force", and the first objective lens 7-1 and the second objective lens 7-2 which are integral with the lens holder 3 are movable in the height direction and in the peripheral direction. As a result, the light flux incident from the mirror 10 to the first objective lens 7-1 can be converged onto the optical disc (not shown). In the first objective lens 7-1, when an optical disc having no function of converging the light is mounted, the second objective lens 7-2 is rotated to be disposed just above the mirror 10, as shown in FIG. 17, by instantaneously supplying rectangular-wave current to the tracking coils 4, and the light can be converged onto the optical disc by using the second objective lens 7-2.

Next, the behavior in the lens switching operation will be described with reference to FIGS. 20 and 21.

In FIG. 20, the first objective lens 7-1 is selected and located just above the mirror 10. When the second objective lens 7-2 is selected to support another type of optical disc in the above state, the lens holder 3 in which the first objective lens 7-1 and the second objective lens 7-2 are mounted is rotated about the shaft center of the sliding shaft 6 by driving means (not shown). Since the movable unit is physically linked to the outside by the FPC 11, the distortion amount of the FPC 11 is increased as the switching angle of the objective lens, that is, the objective lens arrangement angle 20 on the lens holder 3, is increased. Since the distortion of the FPC 11 acts as a resistance force to the movable unit, the rotational angle of the movable unit is smaller than substantially 90° by only an angle which is represented by a displacement angle 19. In the present invention, the objective lens arrangement angle 20 is set to be smaller than the magnetic circuit arrangement angle 13 by he angle corresponding to the displacement angle 19, so that the second objective lens 7-2 can be located just above the mirror 10 as shown in FIG. 21.

As described above, according to the seventh embodiment, the objective lens arrangement angle 20 is set to be smaller than the magnetic circuit arrangement angle 13 by only the displacement angle 19 due to the resistance force of the FPC 11, so that a plurality of objective lenses can be stably positioned just above the mirror 10 with high precision. Further, the positioning can be performed with higher precision by forming the magnetic substances integrally with the lens holder.

Next, an eighth embodiment of the objective lens driving device according to the present invention will be described.

Figure 22:
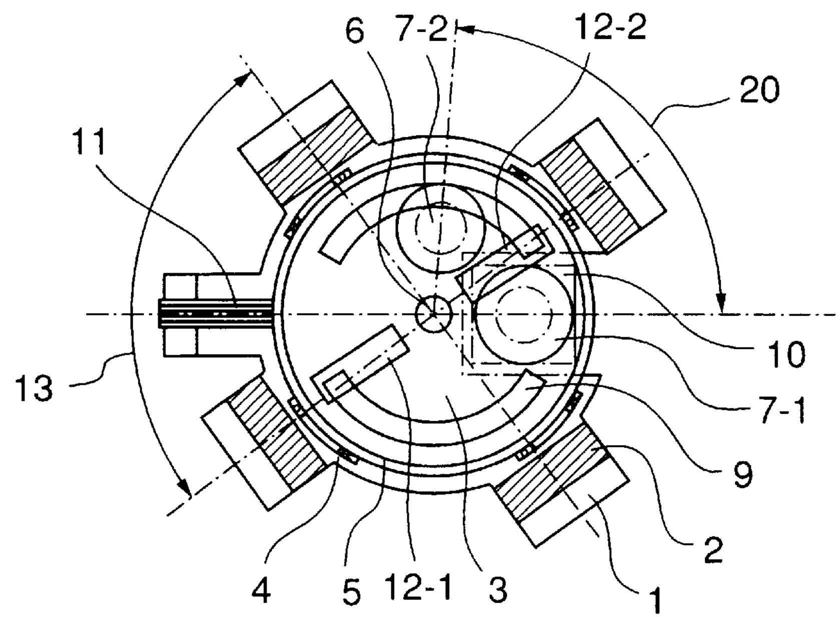
FIG. 22 is an explanatory configuration diagram showing an eighth embodiment of the objective lens driving device according to the present invention.

FIG. 22 is an explanatory configuration diagram showing the constitution of the eighth embodiment. The difference of this embodiment from the seventh embodiment resides in that two magnetic substances 12-1, 12-2 are formed. The other construction is identical to that of the seventh embodiment, and the description thereof is omitted. The two magnetic substances 12-1, 12-2 are disposed symmetrically with respect to the shaft center of the sliding shaft 6. In this case, the magnetic circuit arrangement angle 13 indicates an angle which is formed around the shaft center of the sliding shaft 6 by two magnets 2 which confront a specific magnetic substance 12 when one of the first objective lens 7-1 and the second objective lens 7-2 is selected. As in the case of the seventh embodiment, by setting the objective lens arrangement angle 20 to be smaller than the magnetic circuit arrangement angle 13, the same effect as in the seventh embodiment described above can be obtained. In addition, the number of parts can be reduced and the efficiency of the fabrication process can be enhanced.

Next, a ninth embodiment of the objective lens driving device according to the present invention will be described.

FIG. 23 is a diagram showing the ninth embodiment. The difference of this embodiment from the seventh and eighth embodiments resides in that a substantially cross-shaped magnetic substance 12 is provided in place of plural magnetic substances 12. The other construction is identical to that of the seventh and eighth embodiment, and the detailed description thereof is omitted. As in the case of the seventh embodiment, the objective lens arrangement angle 20 is set to be smaller than the magnetic circuit arrangement angle 13 in this embodiment, whereby the same effect as the first embodiment can be achieved and the number of parts can be reduced to enhance the efficiency of the fabrication process.

Next, a tenth embodiment of the objective lens driving device according to the present invention will be described.

FIG. 24 is an explanatory configuration diagram showing the construction of the tenth embodiment. The difference of the tenth embodiment from the ninth embodiment resides in that a notch portion is provided on a part of the magnetic substance 12 of FIG. 23 so as to be symmetrical with respect to the shaft center of the sliding shaft 6, so that an objective lens 21 having a larger diameter can be mounted. According to this embodiment, as in the case of the ninth embodiment, the objective lens arrangement angle 20 is set to be smaller than the magnetic circuit arrangement angle 13, so that the same effect as the seventh embodiment can be achieved and the number of parts can be reduced to enhance the efficiency of the fabrication process.

In the seventh to tenth embodiments, the current supply to the focusing coil and the tracking coils is performed by a method using FPC. However, the present invention is not limited to this method. For example, the current supply may be performed by lead wires which are independently extended from the respective terminals of the focusing coil 5 and the tracking coils 4. In the above description, the objective lens arrangement angle 20 is assumed to be smaller than the magnetic circuit arrangement angle 13. However, when the direction of the resistance force of the current supply means is different from that of the foregoing description, it is needless to say that the objective lens arrangement angle 20 is set to be larger than the magnetic circuit arrangement angle 13. Further, the number of the objective lens is not limited to two, and it may be equal to three or more. In the foregoing description, the magnetic circuit arrangement angle 13 is assumed to be set to substantially 90°. However, the magnetic circuit arrangement angle 13 is not limited to this value.

As described above, according to the present invention, in the objective lens driving device having the mechanism for switching and selecting one of two or more objective lens in order to support plural types of optical discs, the two objective lens on the lens holder are arranged while the objective lens arrangement angle thereof is displaced with respect to the objective lens switching angle which is determined by a combination of the magnetic substances and the magnetic circuit, whereby the objective lens position which is displaced due to the resistance force of the current supply means such as FPC or the like can be properly corrected, and the objective lens in the lens switching operation can be positioned with high precision.

What is claimed is:

1. An objective lens driving device comprising:

an objective lens for focusing an optical beam onto an optical disc;

a focusing coil for driving said objective lens in an optical axis direction;

tracking coils for driving said objective lens in a radial direction of the optical disc;

a lens holder for holding said objective lens, said focusing coil, and said tracking coils; and a mirror for converting a direction of the optical beam into the optical axis direction of said objective lens;

wherein a lowermost portion of said tracking coils in the optical axis direction of said objective lens projects out lower than a lowermost portion of a surface for holding said tracking coils of said lens holder in the optical axis direction of said objective lens.

2. An objective lens driving device as claimed in claim 1 further comprising:

a magnetic circuit having a magnetic gap in which said focusing coil and said tracking coils are inserted; and a magnetic substance provided on said lens holder, and disposed outside said magnetic gap, and said magnetic circuit magnetically attracts said magnetic substance by a leakage magnetic flux of the magnetic circuit, whereby a position of the objective lens in the tracking direction is controlled.

3. An objective lens driving device comprising:

an objective lens for focusing an optical beam onto an optical disc;

a focusing coil for driving said objective lens in an optical axis direction;

tracking coils for driving said objective lens in a radial direction of the optical disc;

a lens holder for holding said objective lens, said focusing coil, and said tracking coils; and a mirror for converting a direction of said optical beam into the optical axis direction of said objective lens, wherein a distance in the optical axis direction of said objective lens, from an objective lens side uppermost portion of said lens holder to a lowermost portion of said tracking coils is longer than a distance in the optical axis direction of said objective lens, from said objective lens side uppermost portion of said lens holder to a lowermost portion of a surface of said lens holder for holding said tracking coils.

4. The objective lens driving device as claimed in claim 3, wherein a whole or a part of the optical beam incident on said mirror passes through said tracking coils that are adjacent to each other.

5. The objective lens driving device as claimed in claim 3, comprising a sliding shaft that is adapted to support and guide said lens holder, wherein each of said tracking coils is disposed outside said objective lens in the radial direction with respect to said sliding shaft.

6. The objective lens driving device as claimed in claim 3, wherein Lt>Lf, where Lt represents the dimension of each of said tracking coils in the optical axis direction of said objective lens, and Lf represents the dimension of said focusing coil in the optical axis direction of said objective lens.

7. The objective lens driving device as claimed in claim 3, wherein said lens holder is provided with a plurality of said objective lenses, and said objective lenses are mutually switched in accordance with the type of the optical disc.

8. The objective lens driving device as claimed in claim 3, comprising a sliding shaft that is adapted to support and guide said lens holder, wherein said tracking coils are disposed substantially coaxially at an angular interval of substantially 90° around said sliding shaft.

9. An optical disc apparatus having the objective lens driving device as claimed in claim 7, and a control device for controlling a switching operation of said objective lenses by applying current to said tracking coils in accordance with the type of optical disc, whereby plural types of optical disc are reproduced.

10. The objective lens driving device as claimed in claim 3, further comprising:

a magnetic circuit having a magnetic gap in which said focusing coil and said tracking coils are inserted; and a magnetic substance provided on said lens holder, and disposed outside said magnetic gap, and said magnetic circuit magnetically attracts said magnetic substance by a leakage magnetic flux of the magnetic circuit, whereby a position of the objective lens in the tracking direction is controlled.

* * * * *